US012644742B2

(12) United States Patent
Berberig et al.

(10) Patent No.: US 12,644,742 B2
(45) Date of Patent: Jun. 2, 2026

(54) METHOD FOR OPERATING AN ULTRASONIC MEASURING DEVICE, AND AN ULTRASONIC MEASURING DEVICE

(71) Applicant: Endress+Hauser Flowtec AG, Reinach (CH)

(72) Inventors: Oliver Berberig, Grenzach-Wyhlen (DE); Andreas Berger, Erschwil (CH); Sascha Grunwald, Steinen (DE); Klaus Beringer, Untersiemau (DE); Rudolf Braun, Ahorn (DE); Stefan Natterer, Coburg (DE); Michael Münch, Bamberg (DE); Jens Rautenberg, Geseke (DE)

(73) Assignee: Endress+Hauser Flowtec AG, Reinach (CH)

( * ) Notice: Subject to any disclaimer, the term of this patent is extended or adjusted under 35 U.S.C. 154(b) by 304 days.

(21) Appl. No.: 18/693,586

(22) PCT Filed: Aug. 17, 2022

(86) PCT No.: PCT/EP2022/072978
§ 371 (c)(1),
(2) Date: Mar. 20, 2024

(87) PCT Pub. No.: WO2023/041277
PCT Pub. Date: Mar. 23, 2023

(65) Prior Publication Data
US 2024/0393154 A1     Nov. 28, 2024

(30) Foreign Application Priority Data
Sep. 20, 2021     (DE) ..................... 10 2021 124 275.4

(51) Int. Cl.
*G01F 1/667* (2022.01)
*G01F 1/66* (2022.01)
*G01F 25/10* (2022.01)

(52) U.S. Cl.
CPC .............. *G01F 1/667* (2013.01); *G01F 1/662* (2013.01); *G01F 25/10* (2022.01)

(58) Field of Classification Search
CPC . G01F 1/66; G01F 1/662; G01F 1/667; G01F 25/10
See application file for complete search history.

(56) References Cited

U.S. PATENT DOCUMENTS

| | | | | | |
|---|---|---|---|---|---|
| 5,142,504 | A | * | 8/1992 | Koster ................... | G01N 29/02 |
| | | | | | 379/88.16 |
| 2005/0114046 | A1 | * | 5/2005 | Metcalf ..................... | G01F 1/74 |
| | | | | | 702/45 |

(Continued)

FOREIGN PATENT DOCUMENTS

| | | | |
|---|---|---|---|
| DE | 102018109807 | A1 | 10/2019 |
| DE | 102018009199 | A1 | 5/2020 |

(Continued)

OTHER PUBLICATIONS

Machine translation of DE102018133066 (Year: 2020).*

*Primary Examiner* — Natalie Huls
(74) *Attorney, Agent, or Firm* — Christopher R. Powers; Endress+Hauser (USA) Holding, Inc.

(57) ABSTRACT

A method for operating an ultrasonic measuring device, which includes: an arrangement of ultrasonic transducers for emitting and receiving ultrasonic signals along at least two signal paths through a fluid, wherein the arrangement is held by a holding apparatus having at least one wall, wherein sections of the signal paths run through at least one of the at least one wall, wherein signal path sections of at least two signal paths in the fluid are of different length; and an (Continued)

electronic measuring/operating circuit configured to perform the method of, in a first method step, comparing intensities of ultrasonic signals along signal paths having signal path sections of different length in the fluid and, in a second method step, determining a damping property of the fluid and an acoustic coupling property between the wall and the fluid therefrom.

13 Claims, 3 Drawing Sheets

(56)                        References Cited

U.S. PATENT DOCUMENTS

| | | | |
|---|---|---|---|
| 2006/0052963 A1* | 3/2006 | Shkarlet | G01F 1/668 |
| | | | 702/108 |
| 2021/0102825 A1 | 4/2021 | Fuchs et al. | |
| 2022/0091072 A1* | 3/2022 | Berberig | G01F 1/86 |

FOREIGN PATENT DOCUMENTS

| | | | |
|---|---|---|---|
| DE | 102018133066 A1 | 6/2020 |
| EP | 3608639 A1 | 2/2020 |
| GB | 2479115 A | 10/2011 |
| GB | 2479115 A1 | 10/2011 |

* cited by examiner

METHOD FOR OPERATING AN ULTRASONIC MEASURING DEVICE, AND AN ULTRASONIC MEASURING DEVICE

CROSS-REFERENCE TO RELATED APPLICATIONS

The present application is related to and claims the priority benefit of German Patent Application No. 10 2021 124 275.4, filed Sep. 20, 2021, and International Patent Application No. PCT/EP2022/072978, filed Aug. 17, 2022, the entire contents of which are incorporated herein by reference.

TECHNICAL FIELD

The application relates to a method for operating an ultrasonic measuring device for detecting a measured variable of a fluid, such as a flow rate or a damping property. The application also relates to an ultrasonic measuring device for implementing the method.

BACKGROUND

Ultrasonic measuring devices such as those in DE102018133066A1 are state of the art. Accurate determination of measured variables may require precise knowledge of media properties. However, media properties can change dynamically over time, for example in processes, so that it may be necessary to check state-of-the-art measuring devices from time to time or at regular intervals.

SUMMARY

Therefore, the object of the invention is to propose a method for operating an ultrasonic measuring device and such an ultrasonic measuring device in which a media property can be checked.

The object is achieved by an ultrasonic measuring device and a method for operating the same according to the present disclosure.

With a method for operating an ultrasonic measuring device according to the invention, the ultrasonic measuring device comprises:

an arrangement of ultrasonic transducers for emitting and receiving ultrasonic signals along at least two signal paths through a fluid, wherein the arrangement is held by a holding apparatus having at least one wall, wherein sections of the signal paths run through at least one of the at least one wall, wherein signal path sections of at least two signal paths in the fluid are of different length, wherein an electronic measuring/operating circuit of the ultrasonic measuring device, in a first method step, compares intensities of ultrasonic signals along signal paths having signal path sections of different length in the fluid and, in a second method step, determines a damping property of the fluid and an acoustic coupling property between the wall and the fluid therefrom.

In this way, media properties can be determined during operation of the ultrasonic measuring device in a particularly simple and robust manner.

In one embodiment, different lengths of signal paths are configured by different distances in each case between two ultrasonic transducers defining a signal path.

For example, a measuring tube can be designed in such a way that different signal paths through the fluid are of different length.

In one embodiment, different lengths of signal paths are configured by exciting different modes in a Lamb wave apparatus.

Different modes of Lamb waves have different phase velocities and therefore different beam angles. Therefore, the length of a signal path section in the fluid can be set by selecting certain modes.

In one embodiment, the holding apparatus is a measuring tube, which measuring tube guides a fluid flowing through a tube line, wherein the ultrasonic transducers are arranged on an outer surface of the measuring tube, or wherein the arrangement with the holding apparatus is immersed in a fluid located, for example, in a container.

Ultrasonic transducers on the outer surface of a measuring tube can, for example, correspond to a traditional clamp-on ultrasonic measuring device or a Lamb wave ultrasonic measuring device.

In one embodiment, the ultrasonic transducers generate ultrasonic Lamb waves in a Lamb wave apparatus provided for this purpose upon the emission of an ultrasonic signal, wherein the Lamb wave apparatus is the measuring tube wall or a Lamb wave plate of the holding apparatus.

In one embodiment, the arrangement has a longest signal path LS and a shortest signal path KS, wherein the longest signal path and the shortest signal path have a signal path length difference SD, wherein a first estimated value S1 for a sound damping coefficient of the fluid and a second estimated value S2 for a wavelength of the ultrasound in the fluid are used to configure the signal path length difference, wherein the longest signal path is greater than the shortest signal path by at least a number A of second estimated values, wherein the following applies:

$$A \geq -\ln(1-0.1)/(S1*S2),$$

and, in particular, $A \geq -\ln(1-0.3)/(S1*S2)$ with ln as the natural logarithm.

In this way, a sufficiently large difference in the lengths of the signal path sections in the fluid and thus a sufficient measurement accuracy of the damping property and the acoustic coupling property can be ensured.

In one embodiment, a first, quadratic relationship between frequency and damping in the fluid along with a second, exponential relationship between signal path length and damping in the fluid are assumed for determining the damping property and the acoustic coupling property.

In one embodiment, the signal paths pass through the fluid with a maximum of two reflections, and in particular a maximum of one reflection.

In this way, an interfering interaction of ultrasonic signals and ultrasound in the wall can be avoided.

An ultrasonic measuring device according to the invention configured for implementing the method according to the invention comprises:

an arrangement of ultrasonic transducers for emitting and receiving ultrasonic signals along at least two signal paths through a fluid, wherein the arrangement is held by a holding apparatus having at least one wall, wherein sections of the signal paths run through at least one of the at least one wall, wherein signal path sections of at least two signal paths in the fluid are of different length, wherein an electronic measuring/operating circuit of the ultrasonic measuring device is configured to, in a first method step, compare intensities of ultrasonic signals along signal paths having signal path sections of different length in the fluid and, in a second method step, to determine a damping property of the fluid and/or an acoustic coupling property between the wall and the fluid therefrom.

BRIEF DESCRIPTION OF THE DRAWINGS

The invention will now be shown with reference to exemplary embodiments.

DETAILED DESCRIPTION

Figure 1:
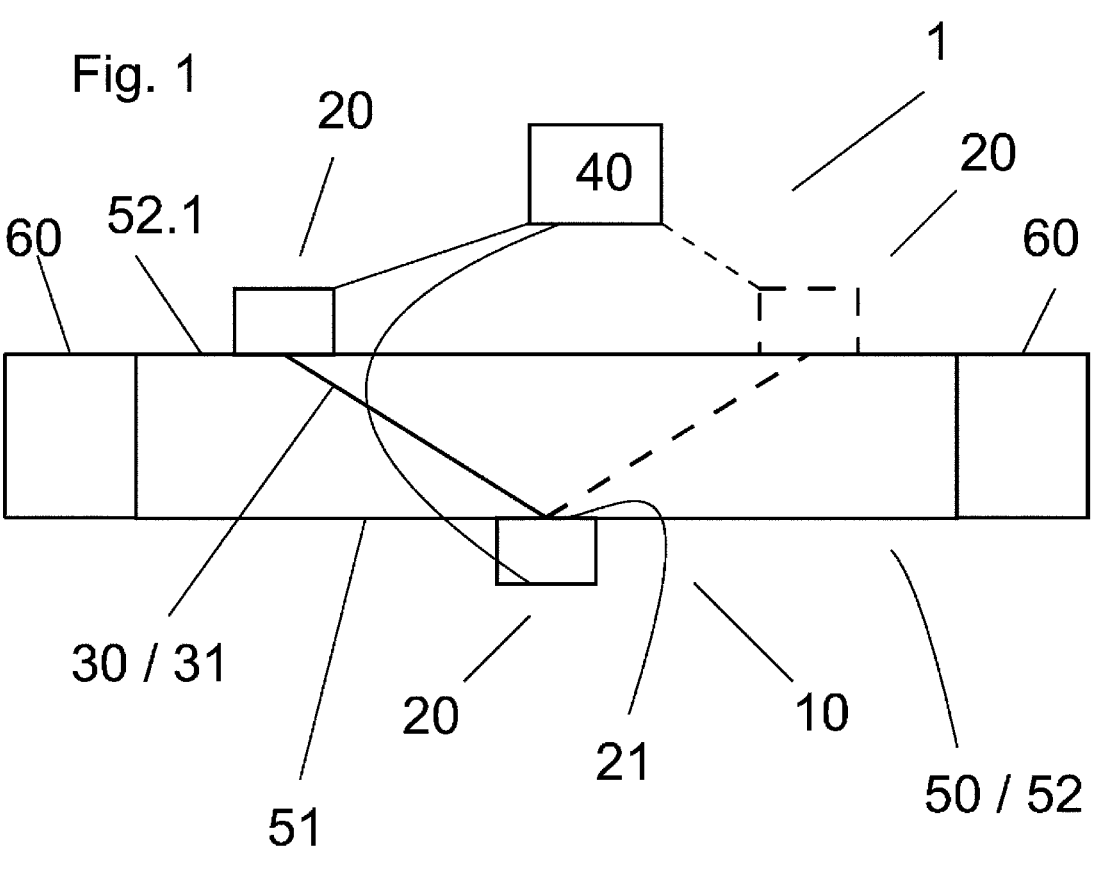
FIG. 1 shows the structure of an exemplary ultrasonic measuring device with a measuring tube according to the present disclosure.

FIG. 1 outlines the structure of an exemplary ultrasonic measuring device 1 with an arrangement 10 of ultrasonic transducers 20, which are arranged on an outer surface 52.1 of a measuring tube 52 integrated in a tube line 60. The measuring tube acts as a holding apparatus 50 for the ultrasonic transducers 20. A signal path 30 between two ultrasonic transducers 20 can be a single-traverse path without reflection or, as shown in dashed lines, a multi-traverse path with at least one reflection. Signal paths in the fluid in each case have a signal path section 31 with one length in each case.

The ultrasonic transducers of an arrangement are operated by an electronic measuring/operating circuit 40, which is also configured to detect measurement signals from the ultrasonic transducers and provide measured values of a measured variable.

The ultrasonic transducers can be clamp-on ultrasonic transducers or Lamb wave ultrasonic transducers, for example. In the case of a Lamb wave ultrasonic transducer, the ultrasonic measuring device has a Lamb wave apparatus 21, which is configured to generate or form and guide Lamb waves. The Lamb wave apparatus can be provided by a wall 51 of the measuring tube. The ultrasonic measuring device can, for example, be a transit time or transit time difference flow meter. The ultrasonic measuring device can also be configured to determine the damping of a fluid.

Figure 2:
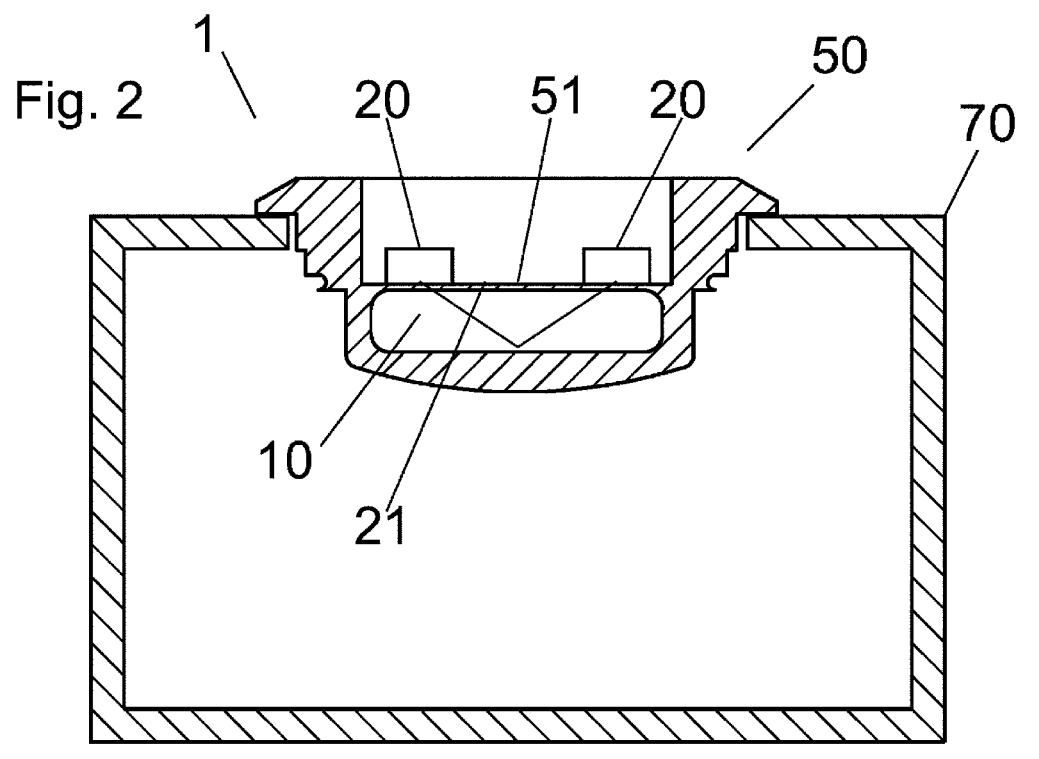
FIG. 2 shows an exemplary submersible ultrasonic measuring device.

FIG. 2 outlines an exemplary ultrasonic measuring device 1, which is immersed in a fluid of a container 70. According to the design shown in FIG. 1, the ultrasonic measuring device has an arrangement 10 of ultrasonic transducers 20, which are arranged on a holding apparatus 50 with a wall 51. As shown in FIG. 1, a signal path 30 between two ultrasonic transducers 20 can be a single-traverse path without reflection or a multi-traverse path with at least one reflection. Signal paths have a signal path section 31 with a length in the fluid. The ultrasonic transducers of an arrangement are operated by an electronic measuring/operating circuit 40 (not shown here for the sake of clarity), which is also configured to detect measurement signals from the ultrasonic transducers and provide measured values of a measured variable. The ultrasonic transducers can be clamp-on ultrasonic transducers or Lamb wave ultrasonic transducers, for example. In the case of a Lamb wave ultrasonic transducer, the ultrasonic measuring device has a Lamb wave apparatus 21, which is configured to generate Lamb waves or to form and guide Lamb waves. As shown here, the arrangement can be inserted in an opening of a container. An arrangement according to the invention can also be used with free-standing fluids.

Figures 3A, 3B, 4A, 4B:
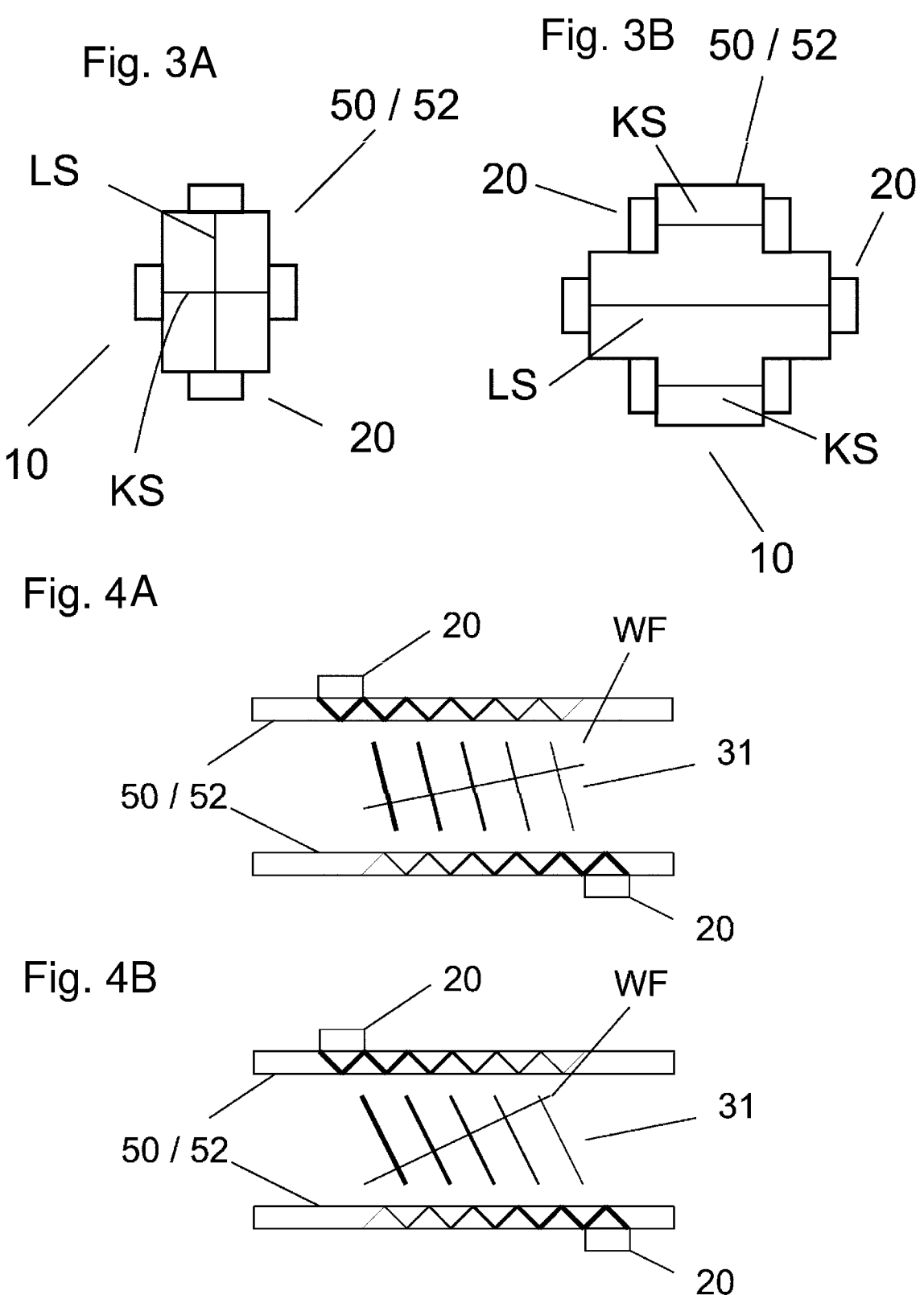
FIGS. 3A and 3B show exemplary arrangements of ultrasonic transducers on a holding apparatus according to the present disclosure, in each case in a front view.
FIGS. 4A and 4B show a further exemplary arrangement of ultrasonic transducers on a holding apparatus in accordance with the present disclosure.

FIGS. 3A and 3B show two exemplary arrangements 10 of ultrasonic transducers 20 according to the invention, in each case in a front view, with which arrangement the method according to the invention can be implemented. According to the invention, ultrasonic signals pass through the fluid along different signal paths, wherein lengths of signal path sections in the fluid of at least two signal paths are different. This can be achieved by a corresponding embodiment of the holding apparatus 50 or the measuring tube 52. As can be seen in FIG. 3A, the holding apparatus can, for example, have a rectangular shape, so that two ultrasonic transducers belonging together are at different distances from one another. Other shapes can also be used as shown in FIG. 3B. More than two signal paths can also be configured, wherein, as shown here, multiple signal paths in the fluid can have signal path sections of the same length, for example. However, according to the invention, at least two signal paths 30 in the fluid have different signal path lengths, so that a shortest signal path section KS is configured in the fluid and a longest signal path section LS is configured in the medium. Signal paths also have sections in the holding apparatus and, in the case of clamp-on ultrasonic transducers, also in a coupling body. However, signal path sections in the fluid are relevant for this invention. The ultrasonic transducers can be clamp-on ultrasonic transducers or Lamb wave ultrasonic transducers, for example.

FIGS. 4A and 4B show a side view of a further exemplary arrangement according to the invention, wherein ultrasonic signals are emitted or received between one another by means of two ultrasonic transducers 20, which are configured to generate Lamb waves in a wall 51 of the holding apparatus 50. Lamb waves have the property of exciting a corresponding Lamb wave plate, such as a wall 51 of a measuring tube 52, over a large area, which ensures a broad transmission of ultrasonic signals into the fluid relative to a wavelength of the ultrasonic signals, see the schematically outlined wave front WF. Beam angles of ultrasonic signals generated by Lamb waves in the medium are dependent on excited Lamb wave modes. By exciting different modes, the beam angle and thus the length of the signal path section in the fluid can be varied. Compare FIG. 4A with FIG. 4B. By sequentially exciting different Lamb wave modes, multiple signal paths having different lengths of signal path sections can be configured in the fluid, even with two ultrasonic transducers.

Figure 5:
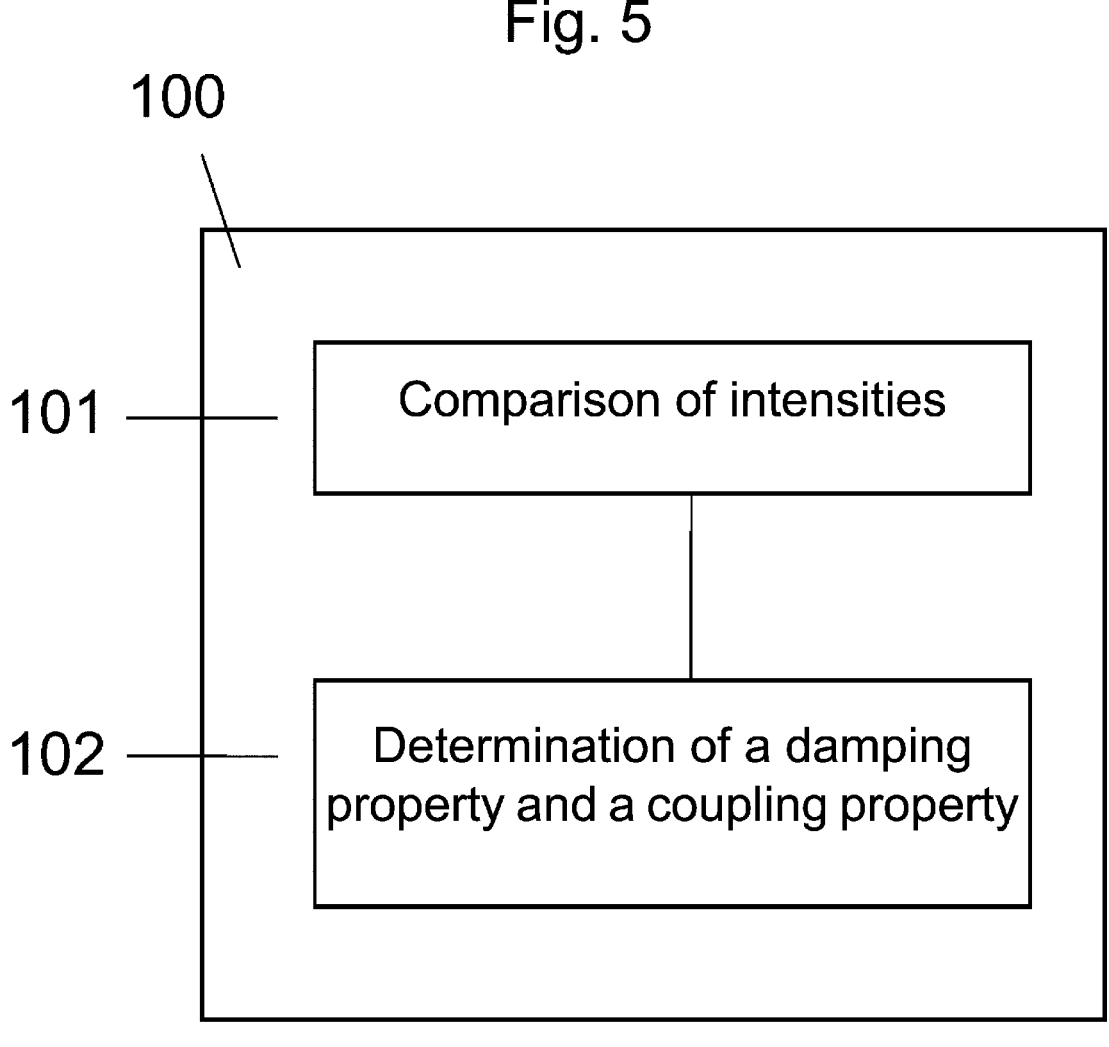
FIG. 5 shows the sequence of an exemplary method according to the present disclosure.

FIG. 5 outlines the sequence of a method 100 according to the invention, wherein, in a first method step 101, the electronic measuring/operating circuit 40 of the ultrasonic measuring device compares intensities of ultrasonic signals along signal paths having signal path sections of different length in the fluid and, in a second method step 102, a damping property of the fluid and/or an acoustic coupling property between the wall and the fluid is determined therefrom.

In one embodiment, the arrangement has a longest signal path section LS in the fluid and a shortest signal path section KS in the fluid, wherein the longest signal path section and the shortest signal path section have a signal path section length difference SD, wherein a first estimated value S1 for a sound damping coefficient of the fluid and a second estimated value S2 for a wavelength of the ultrasound in the fluid are used to configure the signal path section length difference, wherein the longest signal path section is greater than the shortest signal path section by at least a product of a number A and the second estimated value for the wavelength of the ultrasound, wherein the following applies:

$$A \geq -\ln(1 - 0.1)/(S1 * S2),$$

and in particular $A \geq -\ln(1-0.3)/(S1*S2)$
with ln as the natural logarithm.

In this way, a sufficiently large difference in the lengths of the signal path sections in the fluid and thus a sufficient measurement accuracy of the damping property or the acoustic coupling property can be ensured.

In one embodiment, a first, quadratic relationship between frequency and damping in the fluid along with a second, exponential relationship between signal path length and damping in the fluid are assumed for determining the damping property and/or the acoustic coupling property.

In one embodiment, the signal paths pass through the fluid with a maximum of two reflections, and in particular a maximum of one reflection.

In this way, an interfering interaction of ultrasonic signals and ultrasound in the wall can be avoided.

In general, the invention is not limited to the exemplary embodiments shown here; rather, a person skilled in the art can adapt the inventive concept to his requirements.

The invention claimed is:

1. A method for operating an ultrasonic measuring device, the device comprising:
   an arrangement of ultrasonic transducers configured to emit and receive ultrasonic signals along at least two signal paths through a fluid,
   wherein the arrangement is held by a holding apparatus having at least one wall, wherein sections of the at least two signal paths extend through at least the at least one wall, and wherein signal path sections of at least two signal paths in the fluid are of different length; and
   an electronic measuring/operating circuit configured to perform the method via the device,
   the method comprising:
       comparing intensities of ultrasonic signals along signal paths having signal path sections of different length in the fluid; and
       determining a damping property of the fluid and/or an acoustic coupling property between the at least one wall and the fluid therefrom.

2. The method according to claim 1, wherein different lengths of signal path sections in the fluid are configured by different distances in each case between two ultrasonic transducers defining the respective signal path.

3. The method according to claim 1, wherein different lengths of signal paths are configured by exciting different modes in a Lamb wave apparatus.

4. The method according to claim 1, wherein the holding apparatus is a measuring tube, which measuring tube guides a fluid flowing through a tube line,
   wherein the ultrasonic transducers are arranged on an outer surface of the measuring tube, or wherein the arrangement with the holding apparatus is immersed in a fluid within a container.

5. The method according to claim 4, wherein the ultrasonic transducers generate ultrasonic Lamb waves in a Lamb wave apparatus so configured upon the emission of an ultrasonic signal,
   wherein the Lamb wave apparatus is the at least one wall or a Lamb wave plate of the holding apparatus.

6. The method according to claim 1, wherein the arrangement includes a longest signal path section in the fluid and a shortest signal path section in the fluid,
   wherein the longest signal path section and the shortest signal path section have a signal path section length difference,
   wherein a first estimated value for a sound damping coefficient of the fluid and a second estimated value for a wavelength of the ultrasound in the fluid are used to configure the signal path section length difference,
   wherein the longest signal path is greater than the shortest signal path by at least a product of a factor and the second estimated value, wherein the following applies:

$$A \geq -\ln(0.9)/(S1 * S2),$$

wherein A is the factor, S1 is the first estimated value for the sound damping coefficient, S2 is the second estimated value for the wavelength, and In is the natural logarithm.

7. The method according to claim 6, wherein the longest signal path is greater than the shortest signal path such that:

$$A \geq -\ln(0.7)/(S1 * S2).$$

8. The method according to claim 1, wherein a first, quadratic relationship between frequency and damping in the fluid along with a second, exponential relationship between signal path length and damping in the fluid are assumed for determining the damping property and/or the acoustic coupling property.

9. The method according to claim 1, wherein the at least two signal paths pass through the fluid with a maximum of two reflections.

10. The method according to claim 1, wherein the at least two signal paths pass through the fluid with a maximum of one reflection.

11. An ultrasonic measuring device configured to perform the method according to claim 1, the ultrasonic measuring device comprising:
   an arrangement of ultrasonic transducers configured to emit and receive ultrasonic signals along at least two signal paths through a fluid,
   wherein the arrangement is held by a holding apparatus having at least one wall, wherein sections of the at least two signal paths extend through at least the at least one wall, and wherein signal path sections of at least two signal paths in the fluid are of different length; and
   an electronic measuring/operating circuit, which is configured to compare intensities of ultrasonic signals along the at least two signal paths having signal path sections of different length in the fluid and to determine a damping property of the fluid and/or an acoustic coupling property between the at least one wall and the fluid therefrom.

12. The ultrasonic measuring device according to claim 11, wherein:

the holding apparatus is a measuring tube configured to guide a fluid flowing through a tube line, the ultrasonic transducers are arranged on an outer surface of the measuring tube, or the arrangement with the holding apparatus is immersed in a fluid disposed in a container.

13. The ultrasonic measuring device according to claim 12, wherein the ultrasonic transducers generate ultrasonic Lamb waves in a Lamb wave apparatus provided for this purpose upon the emission of an ultrasonic signal, wherein the Lamb wave apparatus is the measuring tube wall or a Lamb wave plate of the holding apparatus.

* * * * *